(No Model.)
W. BEECROFT.
MECHANISM FOR IMPARTING MOTION TO SEWING MACHINE LOOP TAKERS.
No. 390,278. Patented Oct. 2, 1888.
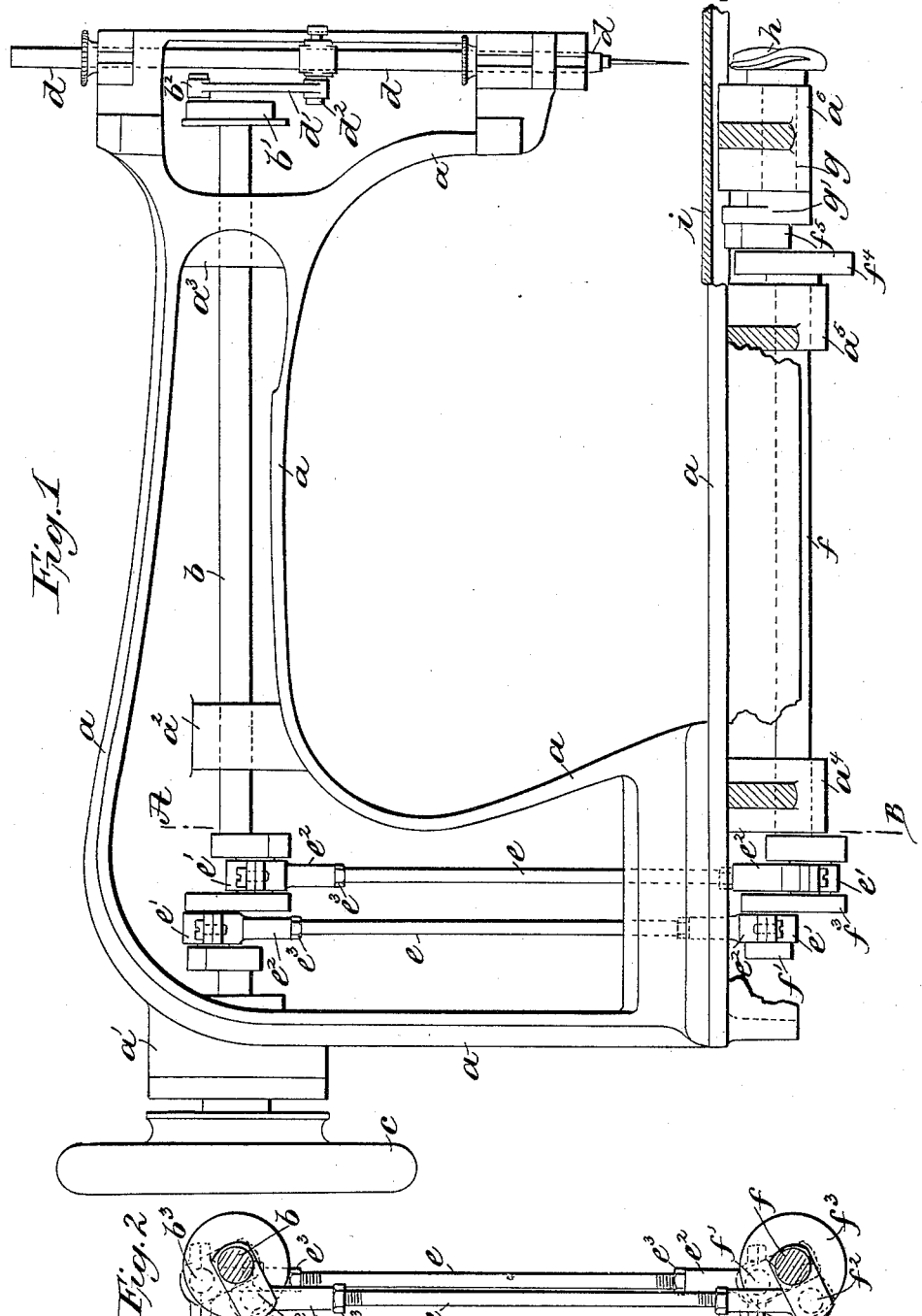

UNITED STATES PATENT OFFICE.

WALTER BEECROFT, OF LEEDS, COUNTY OF YORK, ASSIGNOR TO WILLIAM JONES, OF GUIDE BRIDGE, ENGLAND.

MECHANISM FOR IMPARTING MOTION TO SEWING-MACHINE LOOP-TAKERS.

SPECIFICATION forming part of Letters Patent No. 390,278, dated October 2, 1888.

Application filed April 26, 1888. Serial No. 271,880. (No model.) Patented in England April 13, 1884, No. 11,209.

*To all whom it may concern:*

Be it known that I, WALTER BEECROFT, a citizen of Great Britain, residing at Leeds, in the county of York, England, have invented certain new and useful Improvements in Mechanism for Imparting Motion to Sewing-Machine Loop-Takers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to provide a novel combination of mechanism by which motion from the rotating shaft actuating the needle-slide, having bearings in the arm of the machine, is conveyed to a shaft parallel to said rotary needle-shaft under the cloth-plate of the machine and to a combination, with said shaft under the cloth-plate, of mechanism for giving the required irregular rotary motion to the shuttle or loop-taker. By my improvements a higher speed is obtained with a steady motion.

According to my invention, the upper shaft in the arm of the sewing-machine for giving the up and down movements to the slide-bar which carries the needle has two cranks formed in it—one crank, by preference, at a right angle to the other—and to the journals of each of these cranks one end of a coupling-rod is attached, the other ends of the rods being connected with corresponding journals or crank-pins on a shaft in bearings under the cloth-plate. This last-named shaft has a crank-pin at the end nearest the rotary shuttle or loop-taker, to which one end of a short link is connected, the other end of which is connected in like manner with another crank-pin on another shaft in suitable bearings on the frame under the cloth-plate, this latter shaft being parallel to the first-mentioned shaft under the cloth-plate; but the axes of the two shafts are not in the same line, so that this shaft receives irregular rotary motion, as is well understood, and imparts the same to the shuttle or loop-taker at its outer end.

Referring to the drawings, Figure 1 is a side elevation of the frame of a sewing-machine, in which parts under the cloth-plate are supposed broken away and others shown in section, so as to more clearly exhibit parts, also represented in this figure, which constitute my invention. Fig. 2 is a cross-section at A B, Fig. 1, looking toward the driving-wheel, but only showing the upper and lower shafts and the cranks upon them, and coupling-rods by which they are connected, so as to transmit rotary motion from one to the other.

$a$ is a framing of the machine. $b$ is the rotary needle-shaft, having bearings in the framing at $a'$, $a^2$, and $a^3$. This shaft constitues the main driving-shaft, it being driven by an endless band-pulley on the fly-wheel $c$, secured on said shaft $b$ in the usual manner.

At the front end of the shaft $b$ there is a disk, $b'$, having a crank-pin, $b^2$, in it, to which one end of a rod, $d'$, is connected, the other end being jointed with a pin, $d^2$, or stud in the sliding needle-bar $d$, to which the rotation of the shaft $b$ gives reciprocating motion; or said rotary motion of shaft $b$ may be converted into reciprocating motion by any other desired means to reciprocate the needle-bar.

The shaft $b$ has a double crank, the journals $b^3$ and $b^4$ being at a right angle to each other, and to each crank-journal $b^3$ and $b^4$ one end of a coupling-rod, $e$, is attached by a cap, $e'$, and screws. The other ends of these coupling-rods $e$ are attached in like manner to corresponding crank-journals, $f'$ and $f^2$, formed upon the end of the shaft $f$, as shown in Fig. 1. One of the crank-journals, $f'$, is a pin in the side of a disk, $f^3$, and both crank-journals $f'$ and $f^2$ overhang the bearing $a^4$ for the shaft $f$; but it is obvious that the lower shaft, $f$, if desired, can be constructed as to the double cranks the same as the shaft $b$, with a bearing for the shaft $f$ on each side of its double cranks $f'$ and $f^2$.

The coupling-rods $e$ are shown with their ends $e^2$, in which the journals of the cranks work, separate from the rods $e$, which are screwed into them and secured by lock-nuts $e^3$, and this provides a means of adjusting the lengths of the coupling-rods. This provision for adjustment may, however, be dispensed with when the shafts $b$ and $f$ and cranks upon them are made to an exact standard dimension and distance apart and the coupling-rods to a standard length accordingly.

The shaft $f$ is in bearings $a^4$ and $a^5$, and at the front end has a disk, $f^4$, secured upon it, in which there is a crank-pin, to which one end of a link, $f^5$, is jointed, the other end of which is jointed to a crank-pin on a crank-arm, $g'$, secured on one end of a short shaft, $g$, in bearings at $a^6$ under the framing, the front end of the shaft $g$ having the rotary shuttle-driver or loop-taker $h$ upon it. The short shaft $g$, though parallel to the shaft $f$, is not in the same line. The shuttle-driver or loop-taker $h$ is of any well-known construction, and the feed mechanism, whether above or below the cloth-plate $i$ and other parts of sewing-machines, are of any ordinary or known construction, but form no part of my present invention.

It is obvious that one of the cranks on each shaft and the connecting-rod thereof may be dispensed with; but I prefer to use two such cranks for the purpose of avoiding the difficulty of carrying the crank over its dead-center, which is entirely avoided by the use of two sets of cranks.

I claim as my invention—

The combination, with the short shaft $g$, carrying the crank-disk $g'$, the driving-shaft $f$, provided with two cranks set at right angles to each other, the crank-disk $f^4$, secured to said shaft $f$, and the link $f^5$, connecting the wrist-pins of the crank-disks $f^4$ $g'$, said shafts being arranged below the bed-plate of the machine, one in front of the other, but in different horizontal planes, of the driving-shaft $b$, provided with two cranks set at right angles to each other, said shaft carrying the driving-pulley and being arranged above the bed-plate of the machine in the same vertical plane as and parallel with the shaft $f$, and the rods $e$, substantially as and for the purpose specified.

In testimony whereof I affix my signature in presence of two witnesses.

WALTER BEECROFT.

Witnesses:
PETER J. LIVESEY,
WM. FAULKNER.